(12) United States Patent
Andrade

(10) Patent No.: US 11,279,017 B2
(45) Date of Patent: Mar. 22, 2022

(54) DRYWALL MULTI-TOOL ASSEMBLY

(71) Applicant: Jess Andrade, Brighton, CO (US)

(72) Inventor: Jess Andrade, Brighton, CO (US)

( * ) Notice: Subject to any disclaimer, the term of this patent is extended or adjusted under 35 U.S.C. 154(b) by 265 days.

(21) Appl. No.: 16/668,686

(22) Filed: Oct. 30, 2019

(65) Prior Publication Data

US 2021/0129309 A1 May 6, 2021

(51) Int. Cl.
*B25F 1/04* (2006.01)
*E04F 21/165* (2006.01)
*B26B 5/00* (2006.01)
*G01B 3/04* (2006.01)

(52) U.S. Cl.
CPC ............... *B25F 1/04* (2013.01); *B26B 5/001* (2013.01); *E04F 21/165* (2013.01); *G01B 3/04* (2013.01)

(58) Field of Classification Search
CPC . B26B 11/00–008; B26B 5/001; B26B 5/003; B26B 5/005; B25F 1/04; B25F 1/02; B25F 5/02; B25F 5/021–023; B25G 1/10; B25G 1/102
USPC ................. 7/158, 163, 164, 167, 150, 105
See application file for complete search history.

(56) References Cited

U.S. PATENT DOCUMENTS

| | | | |
|---|---|---|---|
| D305,096 S | 12/1989 | Tench | |
| 4,890,387 A | 1/1990 | Canino | |
| 5,623,737 A | 4/1997 | Moyer, Jr. | |
| 6,363,614 B1 | 4/2002 | Umstead | |
| 7,003,833 B2 * | 2/2006 | Feliciano | B25F 1/04 30/155 |
| 7,530,131 B1 * | 5/2009 | Conrique | B25F 1/04 7/158 |
| 8,051,518 B2 | 11/2011 | Massaro | |
| 9,216,503 B2 * | 12/2015 | Lawrence | B25F 1/04 |
| 9,751,223 B2 | 9/2017 | Raymond | |
| 2004/0172839 A1 * | 9/2004 | Zirk | B43L 7/005 33/451 |
| 2017/0209998 A1 * | 7/2017 | Mongiello | B25B 13/06 |
| 2017/0225314 A1 | 8/2017 | Levand | |

FOREIGN PATENT DOCUMENTS

WO    WO9614189    5/1996

* cited by examiner

*Primary Examiner* — David B. Thomas
*Assistant Examiner* — Robert F Neibaur

(57) ABSTRACT

A drywall multi-tool assembly includes a block that has a plurality of intersecting sides such that the block has a triangular shape. A saw is pivotally coupled to the block for cutting drywall from a plurality of orientations. A knife is slidably coupled to the block for cutting the drywall. A ruler is pivotally coupled to the block for making measurements and a square is pivotally coupled to the block for measuring a right angle. A first bubble level is coupled to the block to determine level along a first axis. A second bubble level is coupled to the block to determine level along a second axis. A rasp is coupled to the block wherein the rasp is configured to abrade the drywall.

12 Claims, 5 Drawing Sheets

DRYWALL MULTI-TOOL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to multi-tool devices and more particularly pertains to a new multi-tool device for performing a variety of tasks associated with installing drywall.

(2) Description of Related Art Including Information Disclosed Under 37 CFR 1.97 and 1.98

The prior art relates to multi-tool devices.

BRIEF SUMMARY OF THE INVENTION

An embodiment of the disclosure meets the needs presented above by generally comprising a block that has a plurality of intersecting sides such that the block has a triangular shape. A saw is pivotally coupled to the block for cutting drywall from a plurality of orientations. A knife is slidably coupled to the block for cutting the drywall. A ruler is pivotally coupled to the block for making measurements and a square is pivotally coupled to the block for measuring a right angle. A first bubble level is coupled to the block to determine level along a first axis. A second bubble level is coupled to the block to determine level along a second axis. A rasp is coupled to the block wherein the rasp is configured to abrade the drywall.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
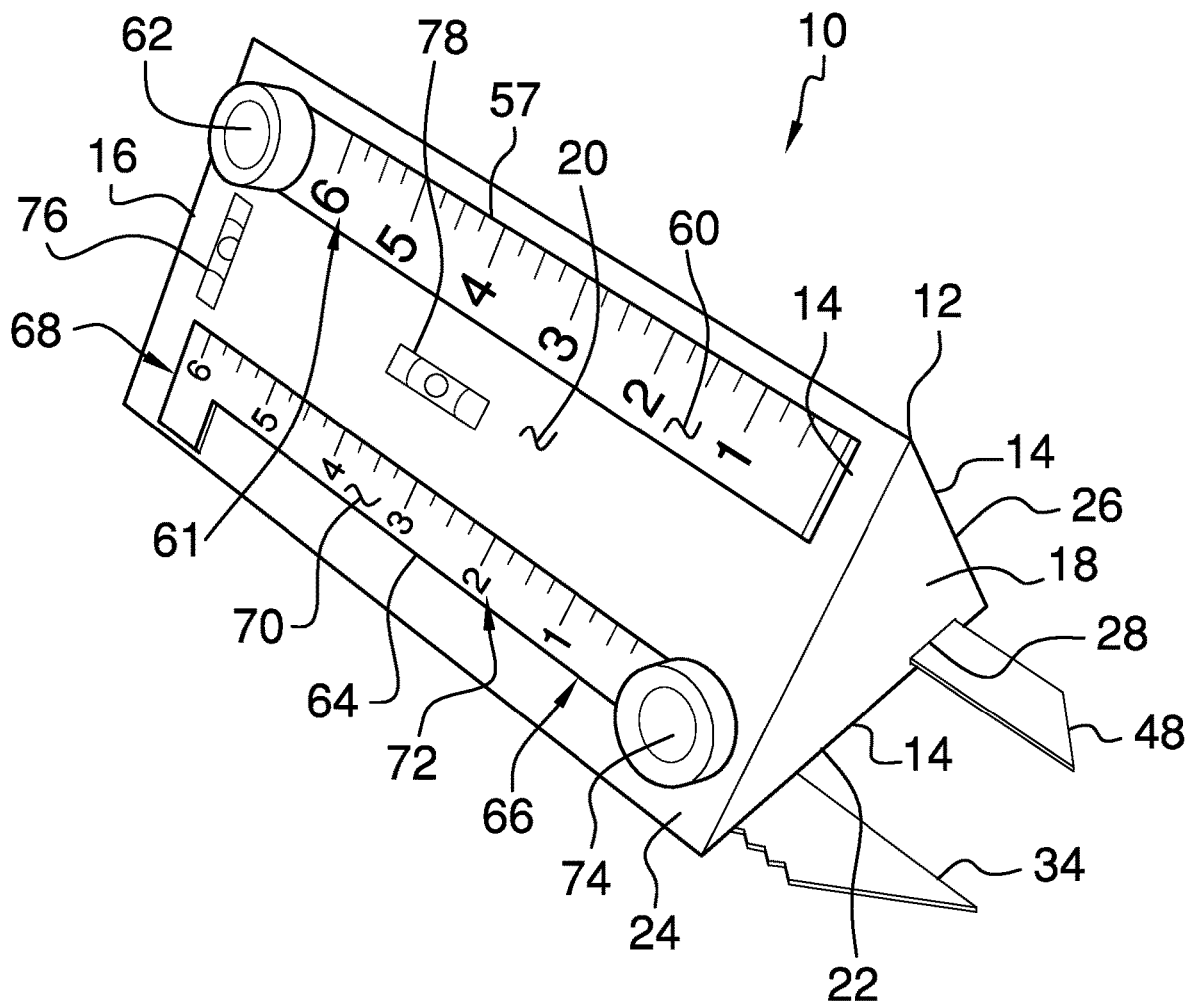
FIG. 1 is a perspective view of a drywall multi-tool assembly according to an embodiment of the disclosure.
Figure 2:
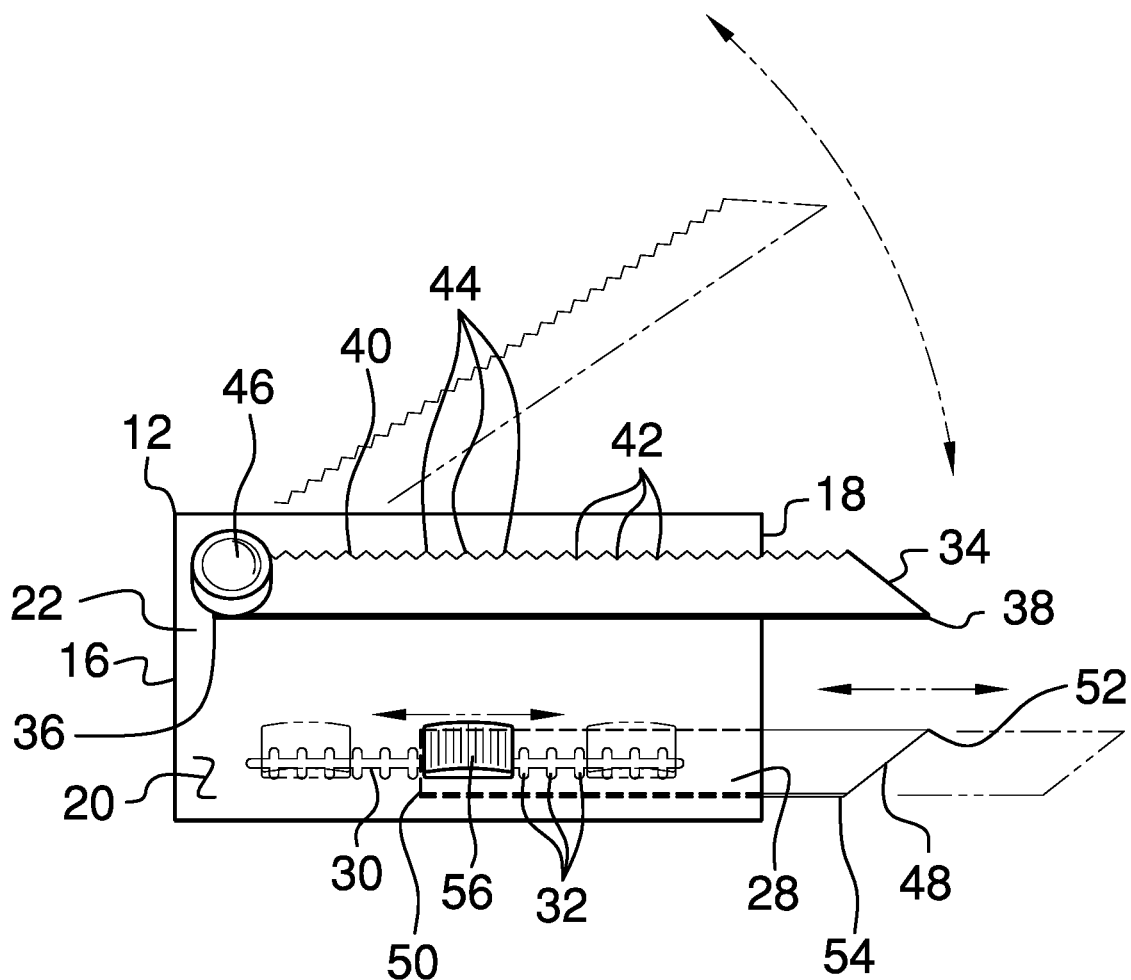
FIG. 2 is a left side phantom view of an embodiment of the disclosure.
Figure 3:
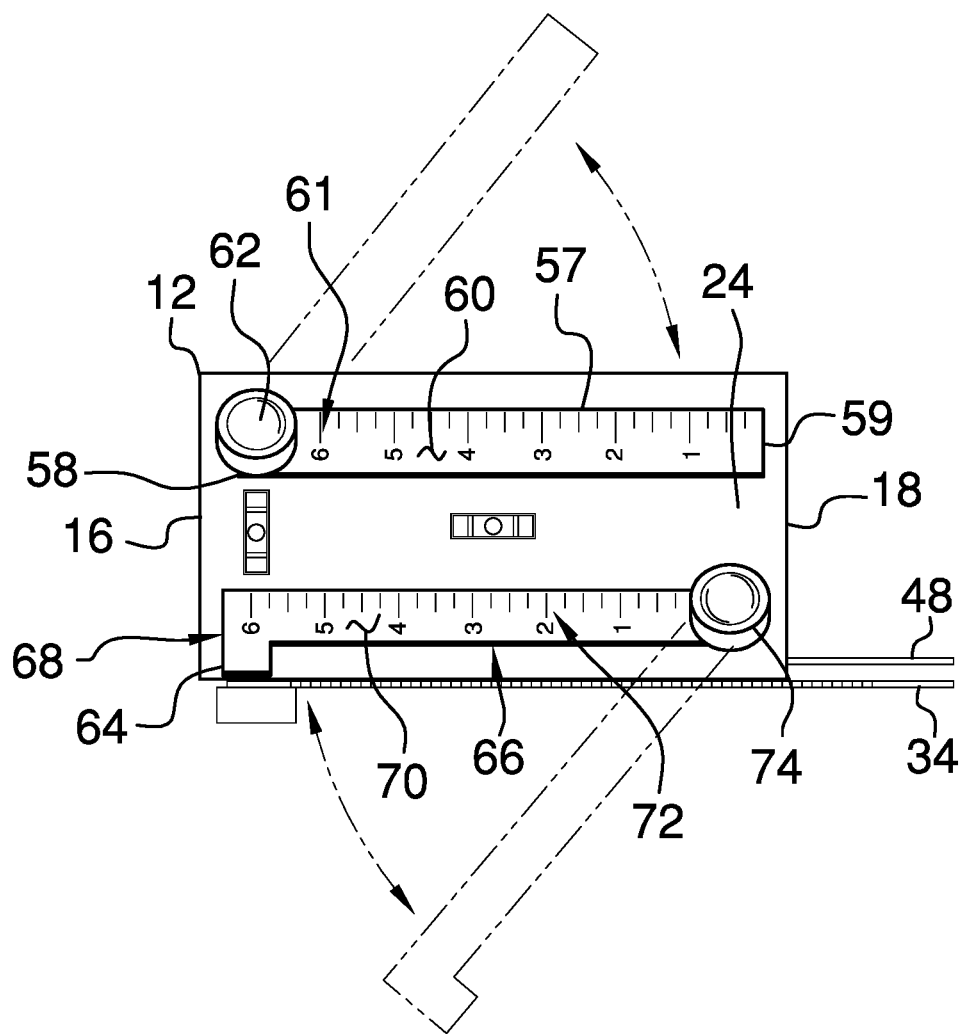
FIG. 3 is a right side view of an embodiment of the disclosure.
Figure 4:
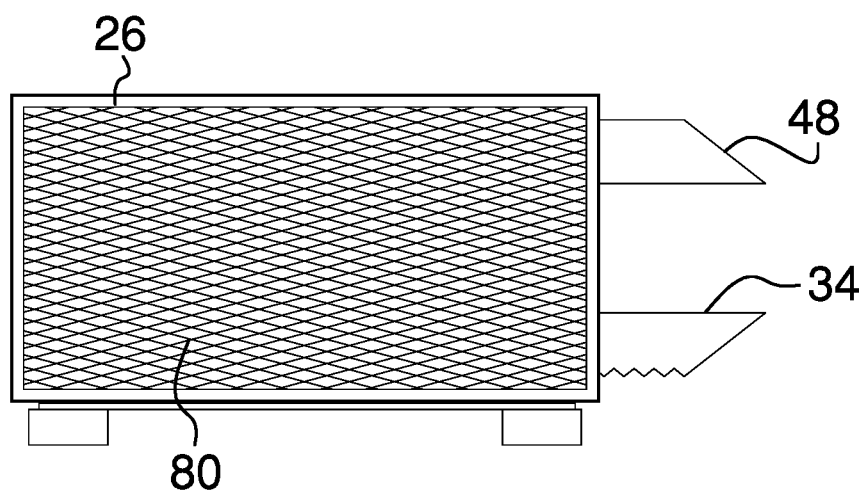
FIG. 4 is a bottom view of an embodiment of the disclosure.
Figure 5:
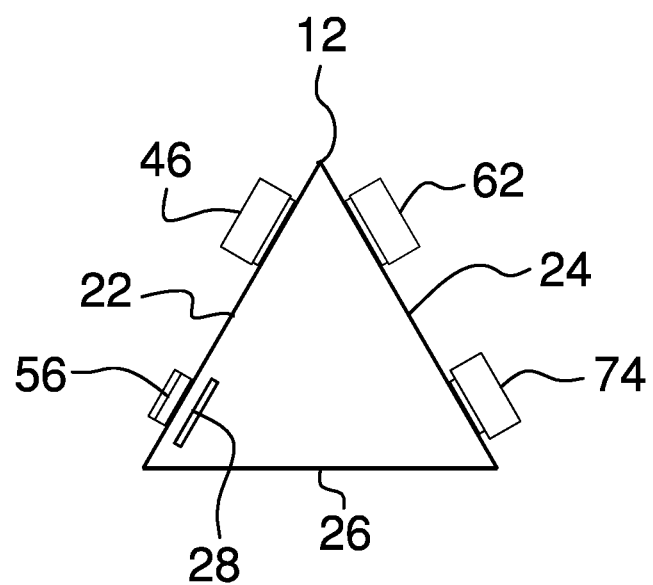
FIG. 5 is a front view of an embodiment of the disclosure.

With reference now to the drawings, and in particular to FIGS. 1 through 5 thereof, a new multi-tool device embodying the principles and concepts of an embodiment of the disclosure and generally designated by the reference numeral 10 will be described.

As best illustrated in FIGS. 1 through 5, the drywall multi-tool assembly 10 generally comprises a block 12 that has a plurality of intersecting sides 14 such that the block 12 has a triangular prism shape. The block 12 has a first end 16, a second end 18 and outer surface 20 extending therebetween. Each of the intersecting sides 14 is associated with the outer surface 20 and the plurality of intersecting sides 14 includes a first side 22, a second side 24 and a third side 26. The second end has a knife well 28 extending toward the second end and the first side 22 has a slot 30 extending into the knife well 28. The slot 30 is elongated to extend substantially between the first end 16 and the second end 18. Moreover, the slot 30 has a plurality of engagement points 32 oriented perpendicular to the slot 30, and the engagement points 32 are spaced apart from each other and are distributed along a full length of the slot 30. The block 12 may have a length of at least 8.0 inches and a width of at least 3.0 inches.

A saw 34 is pivotally coupled to the block 12 and the saw 34 is positionable to extend at a plurality of angles from the block 12. In this way the saw 34 can be manipulated to cut drywall from a plurality of orientations. The drywall may be gypsum board or any other type of drywall commonly used in the construction industry. The saw 34 has a first end 36, a second end 38 and a first edge 40 extending therebetween. The first edge 40 has a series of indentations 42 thereon to define a plurality of teeth 44 on the first edge for sawing the drywall. The saw 34 is positioned on the first side 22 of the outer surface of the block 12 and the second end 38 of the saw 34 extends beyond the second end 18 of the block 12.

A saw pivot 46 extends through the saw 34 and rotatably engaging the first side 22 of the outer surface of the block 12 for pivotally retaining the saw 34 on the block 12. The saw pivot 46 is positioned adjacent to the first end 36 of the saw 34 and the saw pivot 46 is positioned adjacent to the first end 16 of the block 12. The saw pivot 46 may include a knob that can be gripped for pivoting the saw 34.

A knife 48 is slidably coupled to the block 12 and the knife 48 is positionable to extend an adjustable distance from the block 12. In this way the knife 48 can be manipulated to cut or score the drywall. The knife 48 has a first end 50, a second end 52 and a first edge 54 extending therebetween. The knife 48 is slidably positioned in the knife well 28 in the second end 16 of the block 12 and the first edge 54 of the knife 48 is sharpened for cutting or scoring the drywall. The second end 52 of the knife 48 is exposed with respect to the knife well 28.

A button 56 is coupled to the knife 48 and the button 56 is urgeable to slide along the slot 30 for extending and retracting the knife 48. The button 56 is positioned adjacent to the first end 50 of the knife 48. Additionally, the button 56 releasably engages respective ones of the engagement points 32 along the slot 30 for retaining the knife 48 at a selected amount of extension or retraction.

A ruler 57 is pivotally coupled to the block 12 for making measurements and the ruler 57 is positioned on the second side 24 of the outer surface of the block 12. The ruler 57 has a first end 58, a second end 59 and a first surface 60 extending therebetween. The first surface 58 is exposed and the first surface 58 has measuring indicia 61 thereon comprising a graduated scale extending between the first end 58 and the second end 59 of the ruler 57. The ruler 57 may have a length of at least 6.0 inches. A ruler pivot 62 extends through the ruler 57 and rotatably engages the second side 24 of the outer surface of the block 12 for pivotally retaining the ruler 57 on the block 12. The ruler pivot 62 is positioned adjacent to the first end 58 of the ruler 57. The ruler pivot 62 may include a knob for gripping to pivot the ruler 57 on the block 12.

A square 64 is pivotally coupled to the block 12 for measuring a right angle and the square 64 is positioned on the second side 24 of the outer surface of the block 12. The square 64 has a first portion 66 that is oriented perpendicular to a second portion 68. The square 64 has a first surface 70 and the first surface 70 of the square 64 is exposed. Additionally, the first surface 70 of the square 64 has measuring indicia 72 thereon comprising a graduated scale extending along a full length of the first portion 66. A square pivot 74 extends through the first portion 66 of the square 64 and rotatably engages the second side 24 of the outer surface 20 of the block 12 for pivotally retaining the square 64 on the block 12.

A first bubble level 76 is provided and the first bubble level 76 is coupled to the block 12. The first bubble level 76 is oriented to extend along a first axis to determine level along the first axis. Moreover, the first axis is oriented perpendicular to an axis extending through the first end 16 and the second end 18 of the block 12. The first bubble level 76 is positioned on the second side 24 of the outer surface 20 of the block 12 and the first bubble level 76 is positioned between the ruler 57 and the square 64.

A second bubble level 78 is provided and the second bubble level 78 is coupled to the block 12. The second bubble level 78 is oriented to extend along a second axis is oriented perpendicular to the first axis to determine level along the second axis. Moreover, the second axis is oriented collinear with the axis extending through the first end 16 and the second end 18 of the block 12. The second bubble level 78 is positioned on the second side 18 of the outer surface 20 of the block 12 and the second bubble level 78 is positioned between the ruler 57 and the square 64.

A rasp 80 is provided and the rasp 80 is coupled to the block 12. The rasp 80 can be rubbed on the drywall for abrading and shaping the drywall. The rasp 80 is comprised of an abrasive material. The rasp 80 is positioned on the third side 26 of the outer surface 20 of the block 12 and the rasp 80 completely covers the third side 26. The rasp 80 may comprise a steel file that is flattened into a plate or any other planar type of rasp 80.

In use, the block 12 is carried by a user when the user is working on drywall or any other task. In this way the saw 34, the knife 48, the ruler 57, the square 64, the rasp 80, the first bubble level 76 and the second bubble level 78, are available as a single unit, thereby reducing the number of individual tools the user must carry. Every aspect of installing drywall, from checking level, to measuring distance, to checking square of joints, to cutting and shaping the drywall can be accomplished when the user carries the block 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A drywall multi-tool assembly being configured to perform multiple tasks associated with installing drywall, said assembly comprising:
   a block having a plurality of intersecting sides such that said block has a triangular shape;
   a saw being pivotally coupled to said block, said saw being positionable to extend at a plurality of angles from said block wherein said saw is configured to cut drywall from a plurality of orientations;
   a knife being slidably coupled to said block, said knife being positionable to extend an adjustable distance from said block wherein said knife is configured to cut the drywall;
   a ruler being pivotally coupled to said block for making measurements;
   a square being pivotally coupled to said block for measuring a right angle;
   a first bubble level being coupled to said block, said first bubble level being oriented to extend along a first axis wherein said first bubble level is configured to determine level along the first axis;
   a second bubble level being coupled to said block, said second bubble level being oriented to extend along a second axis being oriented perpendicular to said first axis wherein said second bubble level is configured to determine level along said second axis;

a rasp being coupled to said block wherein said rasp is configured to abrade the drywall, said rasp being comprised of an abrasive material;

wherein said block has a first end, a second end and outer surface extending therebetween, said outer surface having said plurality of intersecting sides being associated therewith, said plurality of intersecting sides including a first side, a second side and a third side;

wherein said second end has a knife well extending toward said second end;

wherein said first side has a slot extending into said knife well, said slot being elongated to extend substantially between said first end and said second end, said slot having a plurality of engagement points being oriented perpendicular to said slot, said engagement points being spaced apart from each other and being distributed along a full length of said slot; and wherein said first bubble level is positioned on said second side of said outer surface of said block, said first bubble level being positioned between said ruler and said square, said first axis being oriented perpendicular to an axis extending through said first end and said second end of said block.

2. The assembly according to claim 1, wherein said saw has a first end, a second end and a first edge extending therebetween, said first edge having a series of indentations thereon to define a plurality of teeth on said first edge wherein said first edge is configured to saw the drywall, said saw being positioned on said first side of said outer surface of said block, said second end of said saw extending beyond said second end of said block.

3. The assembly according to claim 2, further comprising a saw pivot extending through said saw and rotatably engaging said first side of said outer surface of said block for pivotally retaining said saw on said block, said saw pivot being positioned adjacent to said first end of said saw, said saw pivot being positioned adjacent to said first end of said block.

4. The assembly according to claim 1, wherein said knife has a first end, a second end and a first edge extending therebetween, said knife being slidably positioned in said knife well in said second end of said block, said first edge of said knife being sharpened for cutting or scoring the drywall, said second end of said knife being exposed with respect to said knife well.

5. The assembly according to claim 4, further comprising a button being coupled to said knife, said button being urgeable to slide along said slot for extending and retracting said knife, said button being positioned adjacent to said first end of said knife, said button releasably engaging respective ones of said engagement points along said slot for retaining said knife at a selected amount of extension or retraction.

6. The assembly according to claim 1, wherein said ruler is positioned on said second side of said outer surface of said block, said ruler having a first end, a second end and a first surface extending therebetween, said first surface being exposed, said first surface having measuring indicia thereon comprising a graduated scale extending between said first end and said second end of said ruler.

7. The assembly according to claim 6, further comprising a ruler pivot extending through said ruler and rotatably engaging said second side of said outer surface of said block for pivotally retaining said ruler on said block, said ruler pivot being positioned adjacent to said first end of said ruler.

8. The assembly according to claim 1, wherein said square is positioned on said second side of said outer surface of said block, said square having a first portion being oriented perpendicular to a second portion, said square having a first surface, said first surface of said square being exposed, said first surface of said square having measuring indicia thereon comprising a graduated scale extending along a full length of said first portion.

9. The assembly according to claim 8, further comprising a square pivot extending through said first portion of said square and rotatably engaging said second side of said outer surface of said block for pivotally retaining said square on said block.

10. The assembly according to claim 1, wherein said second bubble level is positioned between said ruler and said square, said second axis being oriented collinear with said axis extending through said first end and said second end of said block.

11. The assembly according to claim 1, wherein said rasp is positioned on said third side of said outer surface of said block, said rasp completely covering said third side.

12. A drywall multi-tool assembly being configured to perform multiple tasks associated with installing drywall, said assembly comprising:

a block having a plurality of intersecting sides such that said block has a triangular shape, said block having a first end, a second end and outer surface extending therebetween, said outer surface having said plurality of intersecting sides being associated therewith, said plurality of intersecting sides including a first side, a second side and a third side, said second end having a knife well extending toward said second end, said first side having a slot extending into said knife well, said slot being elongated to extend substantially between said first end and said second end, said slot having a plurality of engagement points being oriented perpendicular to said slot, said engagement points being spaced apart from each other and being distributed along a full length of said slot;

a saw being pivotally coupled to said block, said saw being positionable to extend at a plurality of angles from said block wherein said saw is configured to cut drywall from a plurality of orientations, said saw having a first end, a second end and a first edge extending therebetween, said first edge having a series of indentations thereon to define a plurality of teeth on said first edge wherein said first edge is configured to saw the drywall, said saw being positioned on said first side of said outer surface of said block, said second end of said saw extending beyond said second end of said block;

a saw pivot extending through said saw and rotatably engaging said first side of said outer surface of said block for pivotally retaining said saw on said block, said saw pivot being positioned adjacent to said first end of said saw, said saw pivot being positioned adjacent to said first end of said block;

a knife being slidably coupled to said block, said knife being positionable to extend an adjustable distance from said block wherein said knife is configured to cut the drywall, said knife having a first end, a second end and a first edge extending therebetween, said knife being slidably positioned in said knife well in said second end of said block, said first edge of said knife being sharpened for cutting or scoring the drywall, said second end of said knife being exposed with respect to said knife well;

a button being coupled to said knife, said button being urgeable to slide along said slot for extending and retracting said knife, said button being positioned adjacent to said first end of said knife, said button releasably engaging respective ones of said engagement points along said slot for retaining said knife at a selected amount of extension or retraction;

a ruler being pivotally coupled to said block for making measurements, said ruler being positioned on said second side of said outer surface of said block, said ruler having a first end, a second end and a first surface extending therebetween, said first surface being exposed, said first surface having measuring indicia thereon comprising a graduated scale extending between said first end and said second end of said ruler;

a ruler pivot extending through said ruler and rotatably engaging said second side of said outer surface of said block for pivotally retaining said ruler on said block, said ruler pivot being positioned adjacent to said first end of said ruler;

a square being pivotally coupled to said block for measuring a right angle, said square being positioned on said second side of said outer surface of said block, said square having a first portion being oriented perpendicular to a second portion, said square having a first surface, said first surface of said square being exposed, said first surface of said square having measuring indicia thereon comprising a graduated scale extending along a full length of said first portion;

a square pivot extending through said first portion of said square and rotatably engaging said second side of said outer surface of said block for pivotally retaining said square on said block;

a first bubble level being coupled to said block, said first bubble level being oriented to extend along a first axis wherein said first bubble level is configured to determine level along the first axis, said first bubble level being positioned on said second side of said outer surface of said block, said first bubble level being positioned between said ruler and said square, said first axis being oriented perpendicular to an axis extending through said first end and said second end of said block;

a second bubble level being coupled to said block, said second bubble level being oriented to extend along a second axis being oriented perpendicular to said first axis wherein said second bubble level is configured to determine level along said second axis, said second bubble level being positioned between said ruler and said square, said second axis being oriented collinear with said axis extending through said first end and said second end of said block; and a rasp being coupled to said block wherein said rasp is configured to abrade the drywall, said rasp being comprised of an abrasive material, said rasp being positioned on said third side of said outer surface of said block, said rasp completely covering said third side.

* * * * *